(12) United States Patent
Uematsu

(10) Patent No.: US 8,138,728 B2
(45) Date of Patent: Mar. 20, 2012

(54) METHOD AND APPARATUS FOR CONTROLLING ELECTRIC POWER GENERATION FOR VEHICLES

(75) Inventor: Tadashi Uematsu, Kariya (JP)

(73) Assignee: Denso Corporation, Kariya (JP)

( * ) Notice: Subject to any disclaimer, the term of this patent is extended or adjusted under 35 U.S.C. 154(b) by 431 days.

(21) Appl. No.: 12/385,063

(22) Filed: Mar. 30, 2009

(65) Prior Publication Data

US 2009/0251110 A1    Oct. 8, 2009

(30) Foreign Application Priority Data

Apr. 2, 2008 (JP) ................................ 2008-096034

(51) Int. Cl.
*H02P 11/00* (2006.01)
(52) U.S. Cl. ....................................................... 322/18
(58) Field of Classification Search .................... 322/18, 322/27–29, 59–61, 69, 75, 86, 88
See application file for complete search history.

(56) References Cited

U.S. PATENT DOCUMENTS

| | | | | |
|---|---|---|---|---|
| 5,675,238 | A * | 10/1997 | Asao | 322/28 |
| 6,700,355 | B2 * | 3/2004 | Aoyama et al. | 322/36 |
| 7,368,892 | B2 * | 5/2008 | Uematsu et al. | 322/27 |
| 2004/0222772 | A1 * | 11/2004 | Fujita et al. | 322/28 |
| 2006/0238143 | A1 | 10/2006 | Uematsu et al. | |

FOREIGN PATENT DOCUMENTS

| | | |
|---|---|---|
| CN | 1838504 A | 9/2006 |
| JP | A-58-66538 | 4/1983 |
| JP | A-9-107640 | 4/1997 |
| JP | A-2006-271096 | 10/2006 |

OTHER PUBLICATIONS

Jan. 8, 2010 Office Action issued in Japanese Patent Application No. 2008-096034 (with translation).
Chinese Office Action issued Oct. 8, 2010 in Chinese Patent Application No. 200910129581.8 (with translation).

* cited by examiner

*Primary Examiner* — Nguyen N Hanh
(74) *Attorney, Agent, or Firm* — Oliff & Berridge, PLC

(57) ABSTRACT

The present invention provides, as one aspect, an apparatus for controlling electric power generation for vehicles, which controls energization of an excitation winding of a generator driven by an internal-combustion engine controlled by a controller to control output voltage of the generator. The apparatus includes a restraining unit that restrains electric power generation of the generator in response to a given signal, and a releasing unit the releases the restraint by the restraining unit when generated voltage of the generator is equal to or less than a first predetermined value. The apparatus further includes a detecting unit that detects starting of the internal-combustion engine, a measuring unit that measures elapsed time from the detection of the starting by the detecting unit, and a prohibiting unit that prohibits the release of the restraint by the releasing unit until a predetermined time is measured by the measuring unit.

12 Claims, 2 Drawing Sheets

FIG.2
111 GENERATED VOLTAGE
CONTROL CIRCUIT
112 ELECTRIC-POWER
GENERATION
RESTRAINING CIRCUIT
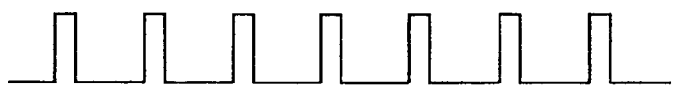
131 ENGINE SPEED
DETECTION CIRCUIT
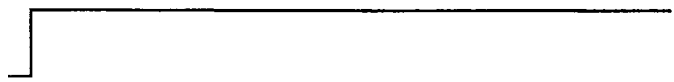
132 TIME MEASUREMENT
CIRCUIT
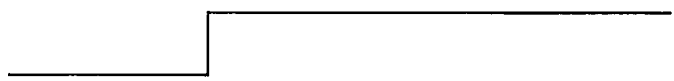
12 ELECTRIC-POWER
GENERATION RESTRAINT
RELEASING CIRCUIT
18 AND CIRCUIT
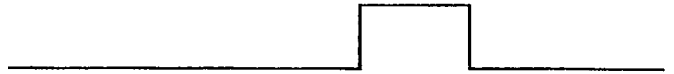
115 OR CIRCUIT
114 AND CIRCUIT

METHOD AND APPARATUS FOR CONTROLLING ELECTRIC POWER GENERATION FOR VEHICLES

CROSS REFERENCE TO RELATED APPLICATION

This application is based on and claims the benefit of priority from earlier Japanese Patent Application No. 2008-96034 filed Apr. 2, 2008, the description of which is incorporated herein by reference.

BACKGROUND OF THE INVENTION

1. Technical Field of the Invention

The present invention relates to a method and an apparatus for controlling electric power generation for vehicles, which control output voltage of a generator loaded on such vehicles as passenger cars and trucks.

2. Related Art

In a state where engine rotation is unstable immediately after starting, electric power generation sharply increases torque load. To prevent this problem, various ideas have been proposed. As an example, a technique is proposed for preventing an engine stall due to the large reduction of generated voltage caused by the increased amount of electrical loads when the electric power generation is restrained. According to the technique, when starting the engine, a function is masked (prohibited) which releases the restraint of the electric power generation when the voltage is below a predetermined value. Next, when detecting the completion of gradual generation control immediately after starting, starting is determined to be completed and the mask of the function is immediately released. Consequently, an engine stall due to the subsequent reduction of voltage is prevented. Such a technique is disclosed, for example, in Japanese Patent Laid-open Publication No. 2006-271096.

In recent years, a vehicle system is known which controls electric power generation by communicating with a vehicle ECU (Electronic Control Unit) to finely control the generation in cooperation with the vehicle ECU. The vehicle system changes regulated voltage in response to a communication signal. In addition, the vehicle system performs control for directly restraining excitation current instead of the conventional control for restraining the electric conductivity of the excitation current.

In the above-described conventional vehicle system, the electric power generation may be stopped by setting the regulated voltage to a voltage lower than the release voltage of the battery during the engine start, or the generation may be restrained by setting the excitation current to a low current. According to the conventional method of determining the completion of the engine start, if lowering the regulated voltage to restrain the electric power generation, an output terminal voltage becomes equal to or higher than the regulated voltage during the engine start. Consequently, the completion of the engine start is determined, and the mask is released in a state where the engine rotation is still practically unstable. If limiting the excitation current to a low current to restrain the electric power generation, gradual generation control is interrupted. Consequently, the completion of the engine start cannot be determined. Although the engine start has been practically completed and the engine is sufficiently stable, the function for releasing the restraint of the electric power generation is left to be masked, until the instruction for restraining the generation is released and the completion of the engine start is determined. Thereby, when a large electric load is applied, the voltage generated by the generator can drop, causing an engine stall.

SUMMARY OF THE INVENTION

The present invention has been made in consideration of the foregoing conventional situation, and an object of the present invention is to provide a method and an apparatus for controlling electric power generation for vehicles, which method and apparatus prevent an engine stall due to the sharp increase of driving torque of a generator immediately after engine start and the drop of voltage immediately after the completion of the engine start.

In order to achieve the object, the present invention provides, as one aspect, an apparatus for controlling electric power generation for vehicles, which controls energization of an excitation winding of a generator driven by an internal-combustion engine controlled by a controller to control output voltage of the generator, comprising: a restraining unit that restrains electric power generation of the generator in response to a given signal; a releasing unit the releases the restraint by the restraining unit when generated voltage of the generator is equal to or less than a first predetermined value; a detecting unit that detects starting of the internal-combustion engine; a measuring unit that measures elapsed time from the detection of the starting by the detecting unit; and a prohibiting unit that prohibits the release of the restraint by the releasing unit until a predetermined time is measured by the measuring unit.

BRIEF DESCRIPTION OF THE DRAWINGS

In the accompanying drawings:

FIG. 2 is a diagram showing operation timing of each part of the generation control apparatus of the embodiment.

DETAILED DESCRIPTION OF THE PREFERRED EMBODIMENTS

Figure 1:
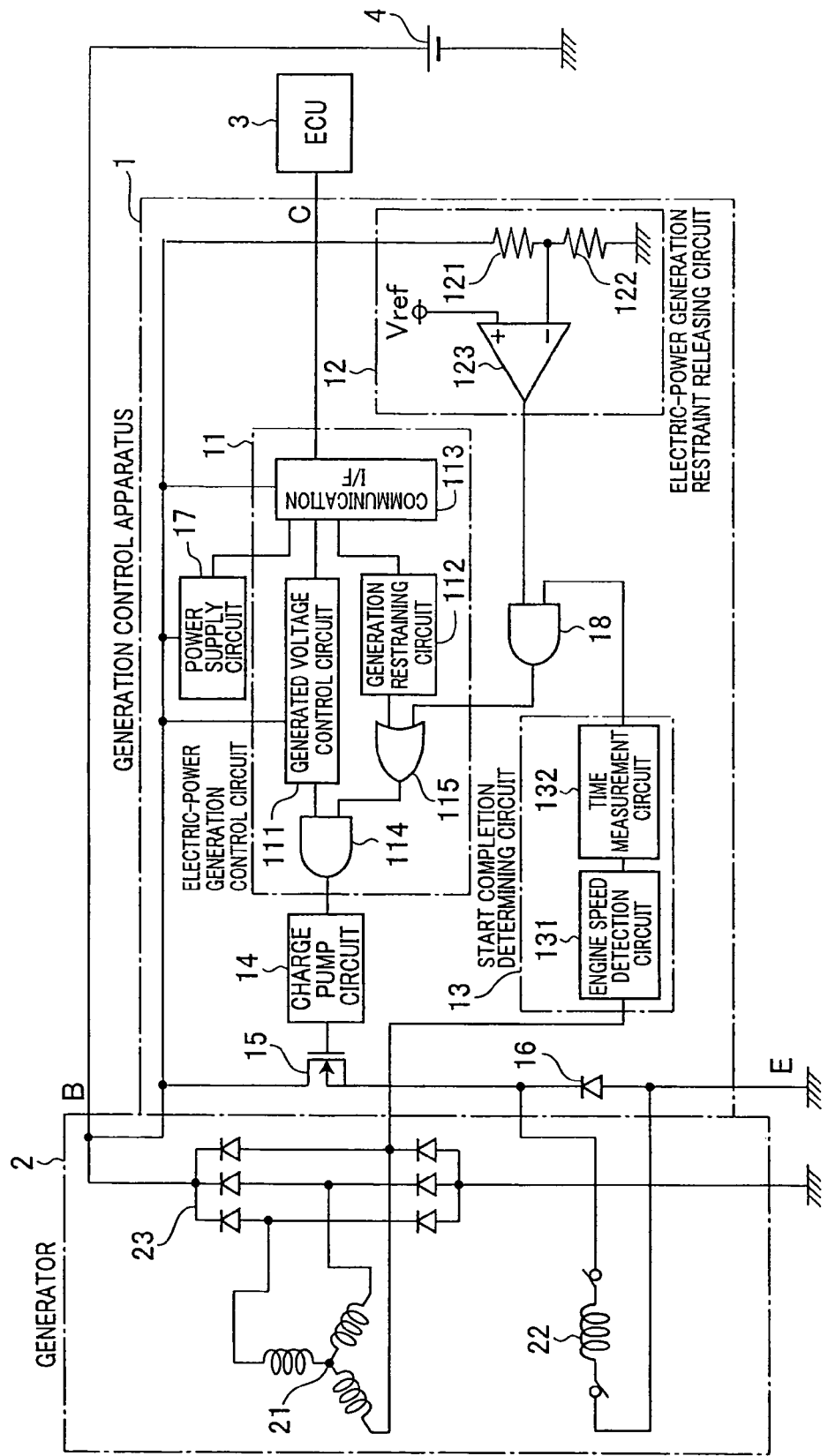
FIG. 1 is a diagram showing a configuration of a generation control apparatus for vehicles of an embodiment.

Hereinafter, a generation control apparatus for vehicles of an embodiment to which the present invention is applied will be described with reference to the accompanying drawings. FIG. 1 is a diagram showing a configuration of the generation control apparatus for vehicles of the embodiment. FIG. 1 further shows a connection state between the generation control apparatus for vehicles, a generator for vehicles, a battery, an ECU (Electronic Control Unit) and the like.

In FIG. 1, a generation control apparatus 1 for vehicles controls the voltage of an output terminal (which is called as "B terminal") of a generator 2 for vehicles to be a predetermined regulated voltage, for example, 14 V. The generation control apparatus 1 has a communication terminal (which is called as "C terminal") and a ground terminal (which is called as "E terminal") as well as the B terminal. The B terminal is connected to a battery 4 and various electric loads (not shown) via predetermined charging lines. The C terminal is connected to an ECU 3 which is an external control unit controlling an engine (internal-combustion engine). The E terminal is connected to a frame of the generator 2. Note that although the generation control apparatus 1 is arranged side by side with the generator 2 in FIG. 1, the generation control apparatus 1 is incorporated into the generator 2 in practice.

The generator 2 is driven by the engine. The generator 2 comprises a three-phase stator winding 21 included in a stator, an excitation winding 22 included in a rotor, and a rectifier circuit 23 for full-wave rectifying the three-phase output of the stator winding 21. The generation control apparatus 1 controls the output voltage of the generator 2. That is, the generation control apparatus 1 intermittently controls the energization of the excitation winding 22 as appropriate.

A detailed configuration and operations of the generation control apparatus 1 will then be described. The generation control apparatus 1 controls a transistor 15 for controlling exciting current to be in the ON or OFF state. Thereby, in response to a communication signal sent from the ECU 3, the generation control apparatus 1 adjusts the exciting current so that the output voltage of the generator 2 becomes the regulated voltage, or restrains electric power generation.

As shown in FIG. 1, the generation control apparatus 1 comprises an electric-power generation control circuit 11, an electric-power generation restraint releasing circuit 12, a start completion determining circuit 13, a charge pump circuit 14, a transistor 15 for controlling exciting current, a free-wheeling diode 16, a power supply circuit 17, and an AND circuit 18.

The transistor 15 is electrically connected in series with the excitation winding 22. When the transistor 15 is in the ON state, exciting current is supplied to the excitation winding 22. The free-wheeling diode 16 is connected in parallel with the excitation winding 22. The free-wheeling diode 16 returns the exciting current when the transistor 15 is in the OFF state.

The electric-power generation control circuit 11 comprises a generated voltage control circuit 111, an electric-power generation restraining circuit 112, a communication interface circuit (communication I/F) 113, an AND circuit 114, and an OR circuit 115. The electric-power generation restraining circuit 112 corresponds to a restraining means (unit). The electric-power generation restraint releasing circuit 12 corresponds to a releasing means (unit). An engine speed detection circuit 131 corresponds to a detecting means (unit). A time measurement circuit 132 corresponds to a measuring means (unit). The AND circuit 18 corresponds to a prohibiting means (unit). The ECU 3 corresponds to a control unit which controls the engine.

On receiving a signal sent from the ECU 3, the communication interface circuit 113 outputs a starting signal to the power supply circuit 17, which supplies drive voltage to each circuit of the generation control apparatus 1, and decodes the received signal. Then, the communication interface circuit 113 outputs the value of electric-power generation control voltage (voltage value for controlling electric power generation) to the generated voltage control circuit 111 and outputs the value of electric-power generation restraint (value for restraining electric power generation) to the electric-power generation restraining circuit 112.

The generated voltage control circuit 111 monitors the output voltage (generated voltage) of the generator 2. The generated voltage control circuit 111 outputs a high/low signal (generated voltage control signal) for controlling the ON/OFF state of the transistor 15 so that the output voltage becomes equal to the value of electric-power generation control voltage received from the communication interface circuit 113. As an example, in the generated voltage control signal of the present embodiment, a high level and a low level are alternately repeated with a certain period. The percentage of the high level in the signal is adjusted to change the electric conductivity of the transistor 15, thereby adjusting the exciting current. Consequently, the generated voltage is controlled to agree with the value of electric-power generation control voltage. The charge pump circuit 14 disposed between the electric-power generation control circuit 11 and the transistor 15 raises the output voltage of the electric-power generation control circuit 11 up to the voltage at which the transistor 15 can be switched.

The electric-power generation restraining circuit 112 outputs an electric-power generation restraining signal at the same timing as the timing when the generated voltage control signal is outputted from the generated voltage control circuit 111 to restrain the amount of generation in response to the value of electric-power generation restraint received from the communication interface circuit 113. The electric-power generation restraining signal has the same period as that of the generated voltage control signal. For example, when the electric conductivity of the transistor 15 is limited to 20% on-duty (the percentage of on-duty in the signal) or less, the electric-power generation restraining circuit 112 outputs an oscillating signal, whose period is the same as that of the generated voltage control signal and in which the percentage of high level is 20%. The electric-power generation restraining signal is inputted into an input terminal of the AND circuit 114 via the OR circuit 115. The generated voltage control signal is also inputted into another input terminal of the AND circuit 114. Consequently, when the percentage of high level in the electric-power generation restraining signal is 20%, the output terminal of the AND circuit 114 outputs a signal having 20% on-duty, even when the percentage of high level in the generated voltage control signal is 20% or more. Therefore, the electric conductivity of the transistor 15 is limited to 20% on-duty or less.

The electric-power generation restraining circuit 112 may restrain the electric power generation by increasing the percentage of on-duty in the electric-power generation restraining signal at a predetermined rate. That is, gradual generation control (load response control) may be performed.

The electric-power generation restraint releasing circuit 12 monitors the output voltage of the generator 2. When the output voltage drops to a predetermined voltage or less, the electric-power generation restraint releasing circuit 12 outputs a high-level signal as an electric-power generation restraint releasing signal. Specifically, the electric-power generation restraint releasing circuit 12 includes a divider circuit configured by resistors 121 and 122 and a voltage comparator 123. The voltage comparator 123 outputs a high-level signal when the voltage obtained by dividing the output voltage of the generator 2 by the divider circuit becomes equal to or less than a predetermined reference voltage Vref. The reference voltage Vref is set to a value (which is compared with a value multiplied by the division ratio of the divider circuit) lower than the lower limit of the electric-power generation control voltage instructed by a signal received from the external unit (ECU 3) and higher than the lowest voltage at which the ECU 3 controlling the engine can operate.

Accordingly, whatever value is set as the electric-power generation control voltage through the communication with the ECU 3, releasing the restraint of electric power generation more than necessary can be prevented. In addition, the restraint of electric power generation can be properly released while the ECU 3 keeps its operable state.

The start completion determining circuit 13 includes the engine speed detection circuit 131 and the time measurement circuit 132. The engine speed detection circuit 131 detects the frequency of one-phase output of the generator 2. When the detected frequency is equal to or more than a predetermined value, the engine speed detection circuit 131 outputs a high-level start detection signal. The engine speed detection circuit 131 detects the starting of the engine. When the time measurement circuit 132 detects the change in the signal outputted from the engine speed detection circuit 131 from low level to high level (that is, the timing when output of the high-level start detection signal starts), the time measurement circuit 132 starts the measurement of duration time of the high level. When a predetermined time has elapsed while keeping the high-level state, the time measurement circuit 132 outputs a high-level start completion determination signal. Thereafter, when the signal outputted from the engine speed detection circuit 131 becomes low level, the time measurement circuit 132 immediately changes the start completion determination signal to low level.

The electric-power generation restraint releasing signal and the start completion determination signal are inputted into the input terminals of the AND circuit 18. An output signal of the AND circuit 18 and the electric-power generation restraining signal are inputted into the input terminals of the OR circuit 115. While the start completion determination signal is low level, even when the electric-power generation restraint releasing signal becomes high level, the AND circuit 18 continues outputting a low-level signal to mask the operation for releasing the restraint of the electric power generation by the electric-power generation restraint releasing circuit 12. After the start completion is determined, that is, when the start completion determination signal becomes high level, the electric-power generation restraining signal outputted from the electric-power generation restraining circuit 112 is masked in response to the electric-power generation restraint releasing signal outputted from the electric-power generation restraint releasing circuit 12, thereby releasing the restraint of the electric power generation. After the restraint of the electric power generation is released, the electric power generation is controlled in response to the generated voltage control signal outputted from the generated voltage control circuit 111.

FIG. 2 is a diagram showing operation timing of each part of the electric-power generation control apparatus 1 of the present embodiment. As shown in FIG. 2, the output signal (start completion determination signal) of the time measurement circuit 132 does not become high level until a predetermined time elapses from the time that the start detection signal becomes high level. Therefore, even when the electric-power generation restraint releasing signal previously outputted from the electric-power generation restraint releasing circuit 12 becomes high level, the operation for releasing the restraint of the electric power generation does not become effective and is masked.

As described above, according to the electric-power generation control apparatus 1 of the present embodiment, the function for releasing the restraint of the electric power generation becomes effective after a predetermined time elapses from the time that engine start is detected. Therefore, the function for releasing the restraint of the electric power generation does not operate during starting time when the engine speed is unstable, thereby preventing an engine stall due to the large increase of electric power generation torque (driving torque) during the starting time. In addition, since the operation of the function for releasing the restraint of the electric power generation can be prohibited (masked) until a predetermined time elapses from the time that the engine start is detected, the prohibited state can be reliably ended, thereby avoiding an engine stall due to the sharp drop of the generated voltage caused when a large electric load is applied.

It will be appreciated that the present invention is not limited to the configurations described above, but any and all modifications, variations or equivalents, which may occur to those who are skilled in the art, should be considered to fall within the scope of the present invention. For example, the electric-power generation restraint releasing circuit 12 may mask (prohibit) the release of the restraint of the electric power generation only when the limit value of the electric conductivity of the excitation current by the electric-power generation restraining circuit 112 is equal to or less than a predetermined value. The limit value of the electric conductivity is a value by which the electric-power generation restraining circuit 112 restrains on-duty of the generated voltage control signal outputted from the generated voltage control circuit 111, that is, a value for decreasing the on-duty (for example, a deference value between the on-duty of the generated voltage control signal outputted from the generated voltage control circuit 111 and the on-duty of the electric-power generation restraining signal outputted from the electric-power generation restraining circuit 112). Consequently, the output of the electric-power generation restraint releasing circuit 12 may be masked when the degree of the restraint of the electric power generation is low.

In a situation in which the electric-power generation restraining circuit 112 restrains the electric conductivity of the excitation current of the generator 2 in response to the electric-power generation restraining signal, when the low-degree restraint of the electric power generation is performed, for example, when restarting the engine in a state where the engine has already been warmed, releasing the restraint of the electric power generation is substantially unnecessary. Therefore, the release of the restraint of the electric power generation may be prohibited only when the limit value of the electric conductivity of the excitation current is equal to or less than a predetermined value. Thereby, the restraint of the electric power generation can be prevented from being released more than necessary.

In the above embodiment, the electric-power generation restraining circuit 112 limits the electric conductivity of the excitation current to restrain the electric power generation. However, the excitation current may be limited to a value in response to the electric-power generation restraining signal to restrain the generation amount. In this case, the electric-power generation restraint releasing circuit 12 may also mask (prohibit) the release of the restraint of the electric power generation only when the degree of the restraint of the electric power generation is low, that is, only when the limit value of the excitation current by the electric-power generation restraining circuit 112 is equal to or less than a predetermined value.

Aspects of the above-described embodiments will then be summarized.

According to the embodiment, an apparatus for controlling electric power generation for vehicles controls energization of an excitation winding of a generator driven by an internal-combustion engine controlled by a controller to control output voltage of the generator. The apparatus comprises a restraining unit that restrains electric power generation of the generator in response to a given signal, a releasing unit the releases the restraint by the restraining unit when generated voltage of the generator is equal to or less than a first predetermined value, a detecting unit that detects starting of the internal-combustion engine, a measuring unit that measures elapsed time from the detection of the starting by the detecting unit, and a prohibiting unit that prohibits the release of the restraint by the releasing unit until a predetermined time is measured by the measuring unit.

The function for releasing the restraint of the electric power generation becomes effective after a predetermined time elapses from the time that engine (internal-combustion engine) start is detected. Therefore, the function for releasing the restraint of the electric power generation does not operate during starting time when the engine speed is unstable, thereby preventing an engine stall during the starting time. In addition, since the operation of the function for releasing the restraint of the electric power generation can be prohibited (masked) until a predetermined time elapses from the time that the engine start is detected, the prohibited state can be reliably ended, thereby avoiding an engine stall due to the sharp drop of the generated voltage caused when a large electric load is applied.

In addition, the first predetermined value is preferably set to a value lower than a lower limit of a voltage value for controlling the electric power generation and higher than a lowest voltage value which allows the controller to operate. Accordingly, whatever value is set as the voltage value for controlling the electric power generation through the communication with an external unit, releasing the restraint of electric power generation more than necessary can be prevented. In addition, the restraint of electric power generation can be properly released while the controller of the internal-combustion engine keeps its operable state, thereby surely preventing an engine stall.

In addition, the restraining unit preferably restrains the electric power generation by limiting electric conductivity of exciting current of the generator to a value corresponding to the given signal. Accordingly, even when the electric conductivity of the exciting current increases by gradual generation control (load response control) and reaches a limit value, and the gradual generation control is interrupted, the completion of the starting of the internal-combustion engine can surely be determined.

In addition, the releasing unit preferably prohibits the release of the restraint only when a limit value of the electric conductivity of the excitation current of the restraining unit is equal to or less than a second predetermined value. In a situation in which the restraining unit restrains the electric conductivity of the excitation current of the generator in response to the given signal, when the low-degree restraint of the electric power generation is performed, for example, when restarting the engine in a state where the engine has already been warmed, prohibiting the release of the restraint of the electric power generation is substantially unnecessary. Therefore, the release of the restraint of the electric power generation may be prohibited only when the limit value of the electric conductivity of the excitation current is equal to or less than the second predetermined value. Thereby, the restraint of the electric power generation can be prevented from being released more than necessary.

In addition, the restraining unit preferably restrains the electric power generation by increasing electric conductivity of excitation current of the generator at a predetermined rate. Conventionally, when the generation restraint is performed, the period of time varies which is necessary for determining the completion of the starting of the engine, due to the electric generating capacity of the generator and the amount of electric load at that time. On the other hand, according to the present embodiment, the completion of the starting can always be determined within a constant period of time, thereby properly determining the completion of the starting.

In addition, the restraining unit preferably restrains the electric power generation by limiting an exciting current value of the generator to a value corresponding to the given signal. Accordingly, even when the electric conductivity of the exciting current increases by gradual generation control (load response control) and reaches a limit value, and the gradual generation control is interrupted, the completion of the starting of the internal-combustion engine can reliably be determined.

In addition, the releasing unit preferably prohibits the release of the restraint only when a limit value of excitation current of the restraining unit is equal to or less than a third predetermined value. In a situation in which the restraining unit restrains the excitation current value of the generator in response to the given signal, when the low-degree restraint of the electric power generation is performed, for example, when restarting the engine in a state where the engine has already been warmed, prohibiting the release of the restraint of the electric power generation is substantially unnecessary. Therefore, the release of the restraint of the electric power generation may be prohibited only when the limit value of the excitation current is equal to or less than the third predetermined value. Thereby, the restraint of the electric power generation can be prevented from being released more than necessary.

What is claimed is:

1. An apparatus for controlling electric power generation for vehicles, which controls energization of an excitation winding of a generator driven by an internal-combustion engine controlled by a controller to control output voltage of the generator, comprising:
   a restraining unit that restrains electric power generation of the generator in response to a given signal;
   a releasing unit that releases the restraint by the restraining unit when generated voltage of the generator is equal to or less than a first predetermined value;
   a detecting unit that detects starting of the internal-combustion engine;
   a measuring unit that measures elapsed time from the detection of the starting by the detecting unit; and
   a prohibiting unit that prohibits the release of the restraint by the releasing unit until a predetermined time is measured by the measuring unit, wherein
   the restraining unit restrains the electric power generation by limiting electric conductivity of exciting current of the generator to a value corresponding to the given signal, and
   the releasing unit prohibits the release of the restraint only when a limit value of the electric conductivity of the excitation current of the restraining unit is equal to or less than a second predetermined value.

2. The apparatus according to claim 1, wherein the first predetermined value is set to a value lower than a lower limit of a voltage value for controlling the electric power generation and higher than a lowest voltage value which allows the controller to operate.

3. The apparatus according to claim 1, wherein the restraining unit restrains the electric power generation by increasing electric conductivity of excitation current of the generator at a predetermined rate.

4. An apparatus for controlling electric power generation for vehicles, which controls energization of an excitation winding of a generator driven by an internal-combustion engine controlled by a controller to control output voltage of the generator, comprising:
   a restraining unit that restrains electric power generation of the generator in response to a given signal;
   a releasing unit that releases the restraint by the restraining unit when generated voltage of the generator is equal to or less than a first predetermined value;
   a detecting unit that detects starting of the internal-combustion engine;
   a measuring unit that measures elapsed time from the detection of the starting by the detecting unit; and a prohibiting unit that prohibits the release of the restraint by the releasing unit until a predetermined time is measured by the measuring unit, wherein the restraining unit restrains the electric power generation by limiting an exciting current value of the generator to a value corresponding to the given signal, and the releasing unit prohibits the release of the restraint only when a limit value of excitation current of the restraining unit is equal to or less than a third predetermined value.

5. The apparatus according to claim 4, wherein
the first predetermined value is set to a value lower than a lower limit of a voltage value for controlling the electric power generation and higher than a lowest voltage value which allows the controller to operate.

6. The apparatus according to claim 4, wherein
the restraining unit restrains the electric power generation by increasing electric conductivity of excitation current of the generator at a predetermined rate.

7. A method of controlling electric power generation for vehicles, which controls energization of an excitation winding of a generator driven by an internal-combustion engine controlled by a controller to control output voltage of the generator, comprising:

restraining electric power generation of the generator in response to a given signal;

releasing the restraint when generated voltage of the generator is equal to or less than a first predetermined value;

detecting starting of the internal-combustion engine;

measuring elapsed time from the detection of the starting; and prohibiting the release of the restraint until a predetermined time is measured, wherein the electric power generation is restrained by limiting electric conductivity of exciting current of the generator to a value corresponding to the given signal, and the release of the restraint is prohibited only when a limit value of the electric conductivity of the excitation current is equal to or less than a second predetermined value.

8. The method according to claim 7, wherein
the first predetermined value is set to a value lower than a lower limit of a voltage value for controlling the electric power generation and higher than a lowest voltage value which allows the controller to operate.

9. The apparatus according to claim 7, wherein
the electric power generation is restrained by increasing electric conductivity of excitation current of the generator at a predetermined rate.

10. A method of controlling electric power generation for vehicles, which controls energization of an excitation winding of a generator driven by an internal-combustion engine controlled by a controller to control output voltage of the generator, comprising:

restraining electric power generation of the generator in response to a given signal;

releasing the restraint when generated voltage of the generator is equal to or less than a first predetermined value;

detecting starting of the internal-combustion engine;

measuring elapsed time from the detection of the starting; and prohibiting the release of the restraint until a predetermined time is measured, wherein the electric power generation is restrained by limiting an exciting current value of the generator to a value corresponding to the given signal, and the release of the restraint is prohibited only when a limit value of excitation current is equal to or less than a third predetermined value.

11. The method according to claim 10, wherein
the first predetermined value is set to a value lower than a lower limit of a voltage value for controlling the electric power generation and higher than a lowest voltage value which allows the controller to operate.

12. The apparatus according to claim 10, wherein
the electric power generation is restrained by increasing electric conductivity of excitation current of the generator at a predetermined rate.

* * * * *